United States Patent
Hsiao

(10) Patent No.: US 8,283,823 B2
(45) Date of Patent: Oct. 9, 2012

(54) MOTOR SHIELD FOR THE DRAINAGE DEVICE OF A COOLING OR AIR-CONDITIONING SYSTEM

(75) Inventor: Yu-Ming Hsiao, Taichung (TW)

(73) Assignee: Holimay Corporation, Taichung (TW)

( * ) Notice: Subject to any disclaimer, the term of this patent is extended or adjusted under 35 U.S.C. 154(b) by 136 days.

(21) Appl. No.: 12/973,408

(22) Filed: Dec. 20, 2010

(65) Prior Publication Data

US 2012/0112586 A1    May 10, 2012

(30) Foreign Application Priority Data

Nov. 5, 2010   (TW) .............................. 99221502 U

(51) Int. Cl.
*H02K 5/00*    (2006.01)
(52) U.S. Cl. ........................................... 310/89; 310/88
(58) Field of Classification Search .............. 310/88–89, 310/406–407
See application file for complete search history.

(56) References Cited

U.S. PATENT DOCUMENTS

| | | | |
|---|---|---|---|
| 4,814,653 A * | 3/1989 | Hasegawa et al. ............... | 310/90 |
| 6,322,326 B1 * | 11/2001 | Davis et al. ..................... | 417/40 |
| 6,657,338 B2 * | 12/2003 | Fisher et al. ..................... | 310/89 |
| 6,927,509 B2 * | 8/2005 | Cichetti, Sr. ..................... | 310/52 |
| 7,196,439 B2 * | 3/2007 | Pierret et al. ..................... | 310/58 |
| 7,252,482 B2 | 8/2007 | Walker et al. | |
| 7,345,391 B2 * | 3/2008 | Bradfield et al. ............... | 310/89 |
| 7,414,339 B2 * | 8/2008 | Kitamura et al. ........... | 310/68 D |
| 7,615,897 B2 * | 11/2009 | Kinoshita ....................... | 310/63 |
| 7,977,831 B2 * | 7/2011 | De Filippis et al. ............ | 310/58 |
| 7,977,835 B2 * | 7/2011 | Simofi-Ilyes et al. .......... | 310/89 |

FOREIGN PATENT DOCUMENTS

TW   M308567   3/2007

* cited by examiner

*Primary Examiner* — Thanh Lam
(74) *Attorney, Agent, or Firm* — Muncy, Geissler, Olds & Lowe, PLLC

(57) ABSTRACT

A motor shield covered on a motor of a drainage device over a cooling vane is disclosed to include a shield body having an arched portion and a straight portion, a guide wall disposed in the shield body and having an arched segment and a straight segment connected to the straight portion of the shield body, an airflow zone defined in the shield body in an interference relationship relative to the cooling vane and surrounded by the arched segment and straight segment of the guide wall and the arched portion and straight portion of the shield body, horizontally extending air outlets and vertically extending air outlets respectively located on the arched portion and straight portion of the shield body, and air inlets located on the periphery of the shield body. During rotation of the cooling vane, a flow of air is induced to carry heat out of the shield body through the vertically and horizontally extending air outlets efficiently.

9 Claims, 6 Drawing Sheets

MOTOR SHIELD FOR THE DRAINAGE DEVICE OF A COOLING OR AIR-CONDITIONING SYSTEM

BACKGROUND OF THE INVENTION

1. Field of the Invention

The present invention relates to drainage device technology and more particularly, to a motor shield for the drainage device of a cooling or air-conditioning system, which provides an airflow guiding function.

2. Description of the Related Art

A drainage device for use in a cooling or air-conditioning system generally uses a motor to provide a dynamic force for drainage of water. However, a motor releases waste heat during operation. Therefore, a drainage device of this type must have a heat dissipation device to assure normal working of the product.

Taiwan Utility Model M308567, issued to the present inventor, discloses a heat dissipation technique entitled "Motor shield with hot airflow guiding function to dissipate heat". According to this design, an arched guide board is arranged on the surface of the top side of the motor shield for shunting discharged gas so that a part of the discharged gas, subject to the guidance of the arched guide board, is kept flowing within a predetermined distance without scattering, enhancing the stability of the eddy flow of the discharged gas.

However, the aforesaid prior art technique is adapted for guiding the discharged gas that flows out of the motor shield but not for guiding the flow of gas inside the motor shield. According to this design, the heat dissipation effect produced subject to the airflow guiding functioning of the arched guide board is limited.

U.S. Pat. No. 7,252,482, entitled "Motor driven pump with improved motor cooling air flow", discloses an electric motor-driven pump adapted for pumping condensate from refrigeration and air conditioning systems in which a motor cover mounted on a reservoir cover defines a vertically extending cooling air inlet and horizontally extending discharge ports for the flow of cooling air propelled by a fan. This design does not provide a significant airflow guiding function. The horizontally extending discharge ports simply facilitate outward dispersion of cooling air propelled by the fan. This arrangement does not significantly enhance heat dissipation.

SUMMARY OF THE INVENTION

The present invention has been accomplished under the circumstances in view. It is the main object of the present invention to provide a motor shield for the drainage device of a cooling or air-conditioning system, which greatly enhances heat dissipation.

To achieve this and other objects of the present invention, a motor shield is installed in a drainage device of a cooling/air-conditioning system and covered on a motor of the drainage device over a cooling vane at the motor. The motor shield comprises a shield body defining a chamber for accommodating the cooling vane of the motor and having a top wall thereof divided into an arched portion and a straight portion, a guide wall disposed in the top side in the shield body within the chamber and having an arched segment and a straight segment connected to the straight segment of the guide wall, an airflow zone defined in the chamber inside the shield body in an interference relationship relative to the cooling vane of the motor and surrounded by the arched segment and straight segment of the guide wall and the arched portion and straight portion of the top wall of the shield body, a plurality of horizontally extending air outlets located on the arched portion of the top wall of the shield body, a plurality of vertically extending air outlets located on the straight portion of the top wall of the shield body, and at least one air inlet located on the periphery of the shield body. Thus, when the cooling vane is rotated, a flow of air is induced to carry heat out of the shield body through the vertically and horizontally extending air outlets efficiently.

DETAILED DESCRIPTION OF THE INVENTION

Figure 1:
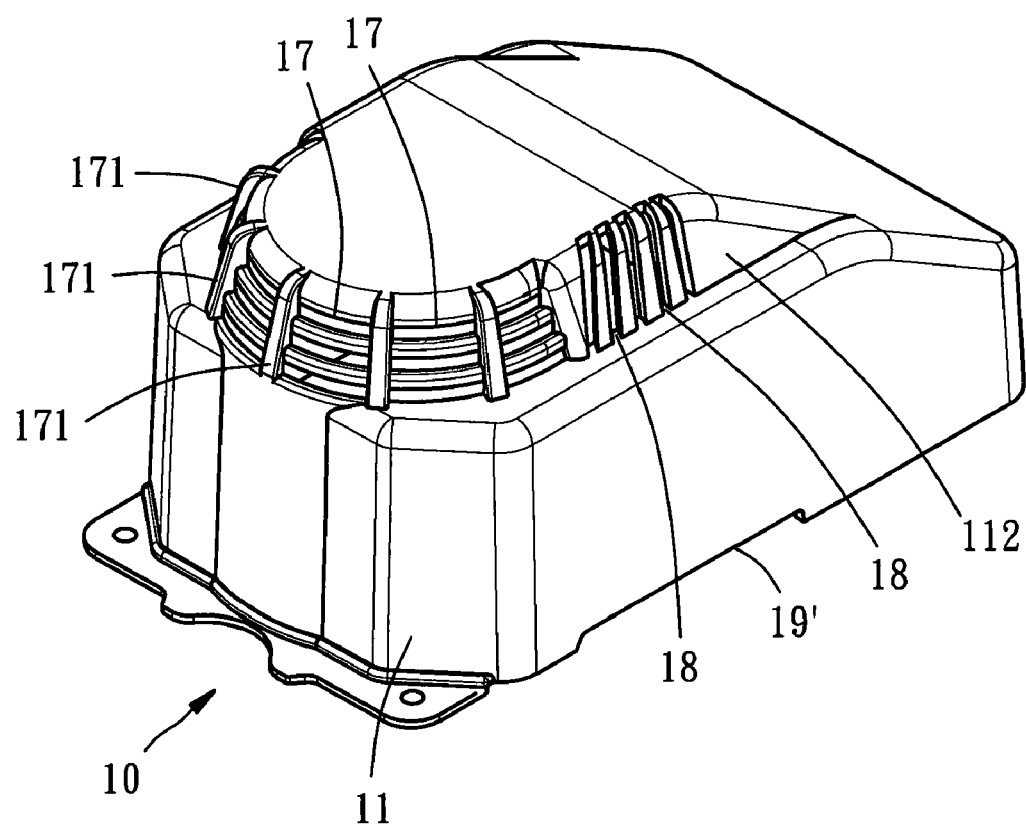
FIG. 1 is an oblique top elevational view of a motor shield in accordance with a first embodiment of the present invention.
Figure 2:
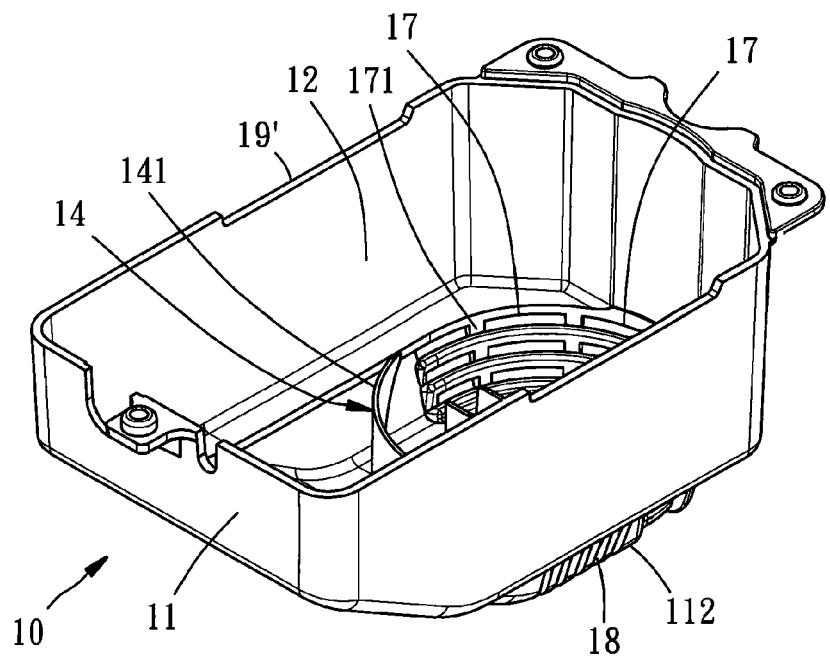
FIG. 2 is an oblique bottom elevational view of the motor shield in accordance with the first embodiment of the present invention.
Figure 3:
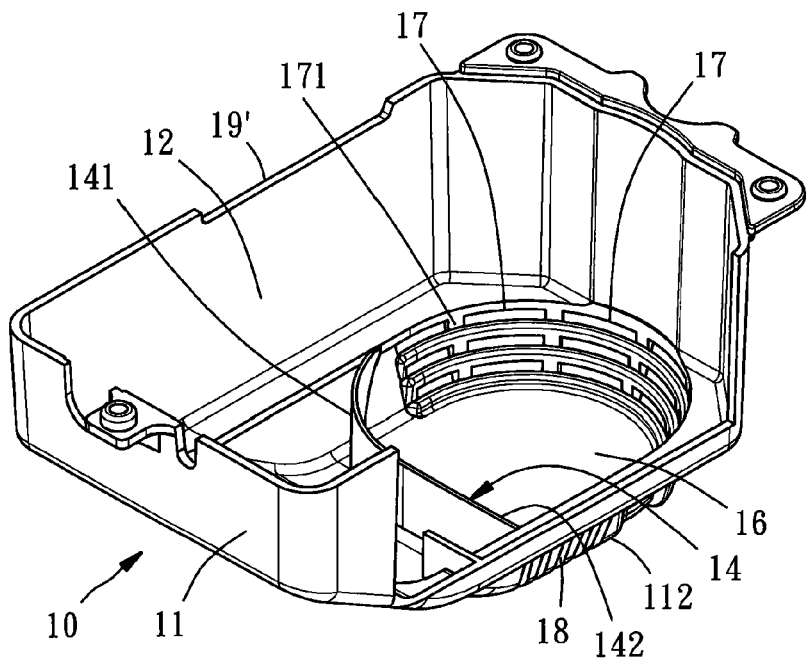
FIG. 3 is a sectional elevation of the first embodiment of the present invention, illustrating the internal structure of the motor shield.
Figure 4:
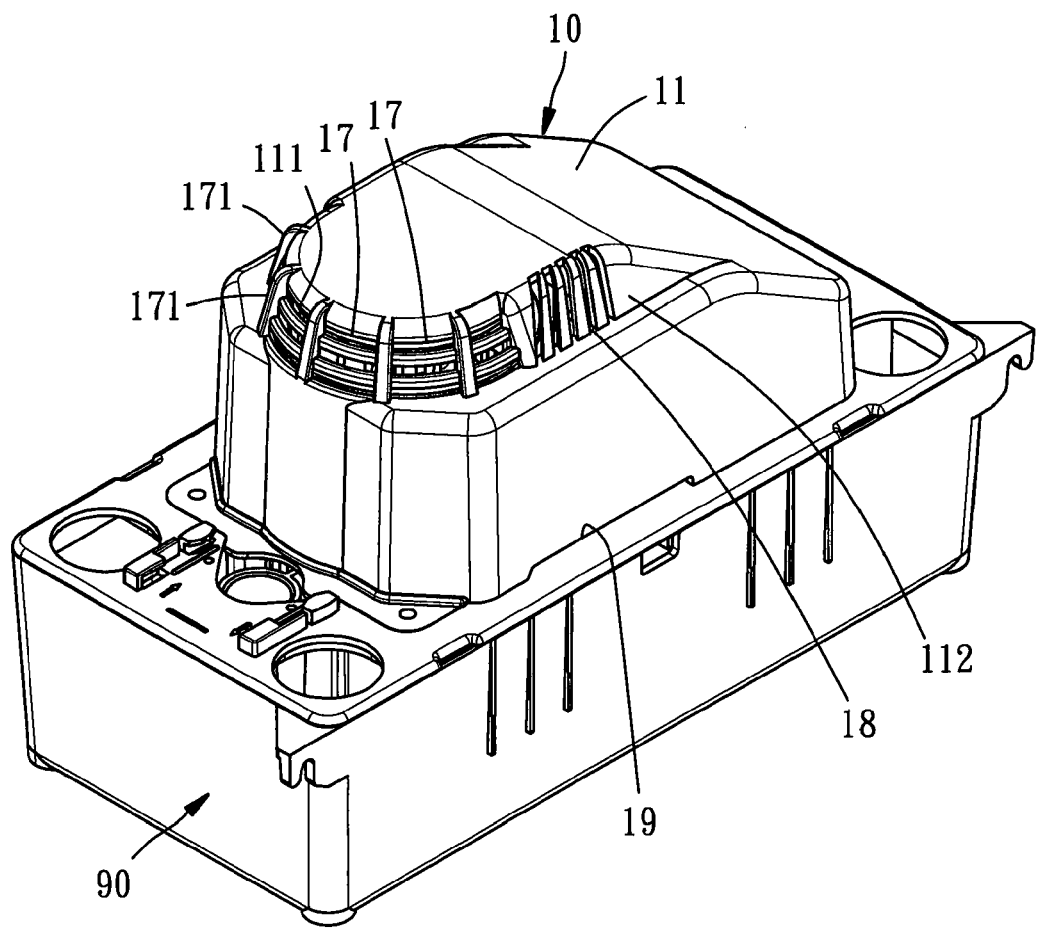
FIG. 4 is an applied view of the first embodiment of the present invention, illustrating the motor shield fastened to a drainage device.
Figure 5:
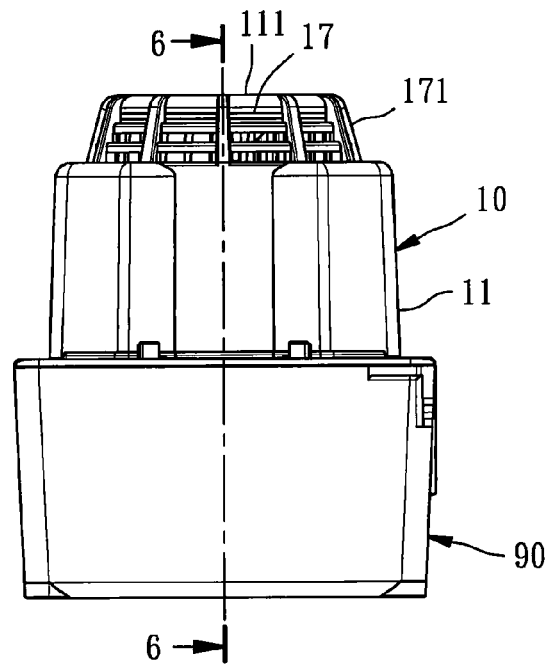
FIG. 5 is a left side view of FIG. 4.

Referring to FIGS. 1~7, a motor shield 10 in accordance with a first embodiment of the present invention is shown installed in a drainage device 90 of a cooling (refrigeration) or air-conditioning system and covered on a motor 91. FIGS. 1~3 illustrate the structure of the motor shield 10. FIGS. 4~7 illustrate the motor shield 10 jointed to the drainage device 90.

The motor shield 10 comprises a shield body 11 defining therein a chamber 12. After covering of the shield body 11 on the drainage device 90, the chamber 12 is adapted for accommodating a motor 91 having a cooling vane 92. A guide wall 14 is located on the inside of the shield body 11 at the top. The guide wall 14 has an arched segment 141 and a straight segment 142. The shield body 11 has its top wall divided into an arched portion 111 and a straight portion 112. An airflow zone 16 is defined in the shield body 11 and surrounded by the arched segment 141 and straight segment 142 of the guide wall 14 and the arched portion 111 and straight portion 112 of the top wall of the shield body 11. The straight portion 112 of the top wall of the shield body 11 and the straight segment 142 of the guide wall 14 are connected together. The arched portion 111 of the top wall of the shield body 11 defines a plurality of horizontally extending air outlets 17. The straight portion 112 of the top wall of the shield body 11 defines a plurality of vertically extending air outlets 18. Further, the cooling vane 92 is set in interference with the airflow zone 16. The shield body 11 further has at least one air inlet 19 defined in the peripheral wall thereof. According to this embodiment, the shield body 11 has two openings 19' respectively located on the bottom edge of the shield body 11 at two opposite sides. After the shield body 11 is covered on the drainage device 90, the two openings 19' form two air inlets 19 in the bottom edge of the peripheral wall of the shield body 11 at two opposite sides.

According to this embodiment, the vertically extending air outlets 18 are axially set in a tangential manner relative to the cooling vane 92. Further, the guide wall 14 is a plate member formed integral with the shield body 11. Further, the shield body 11 has a plurality of reinforcing ribs 171 that are spaced corresponding to the horizontally extending air outlets 17 to reinforce the structural strength of the shield body 11.

The operation of the motor shield 10 will be described hereinafter.

Figure 6:
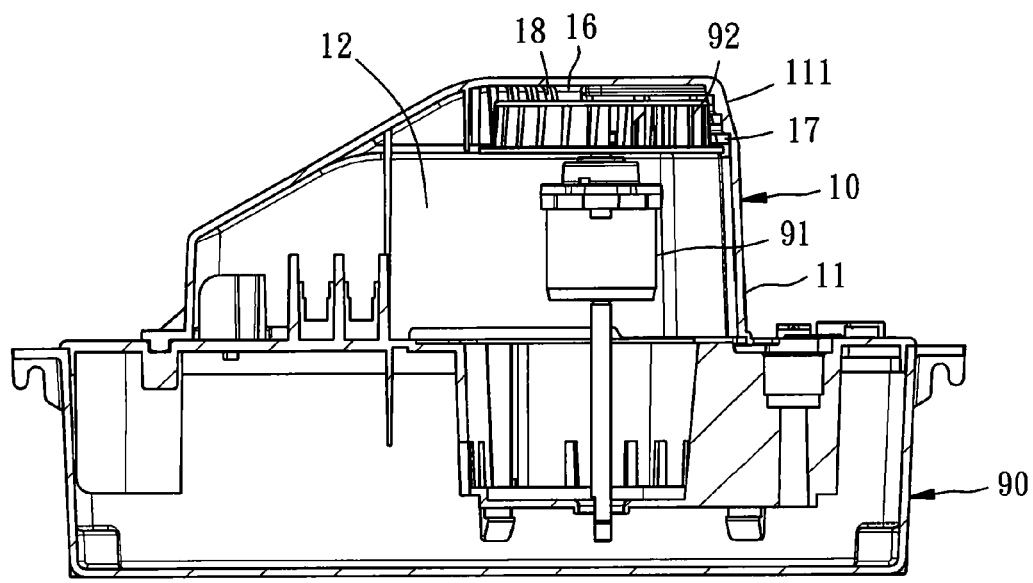
FIG. 6 is a sectional view taken along line 6-6 of FIG. 5.
Figure 7:
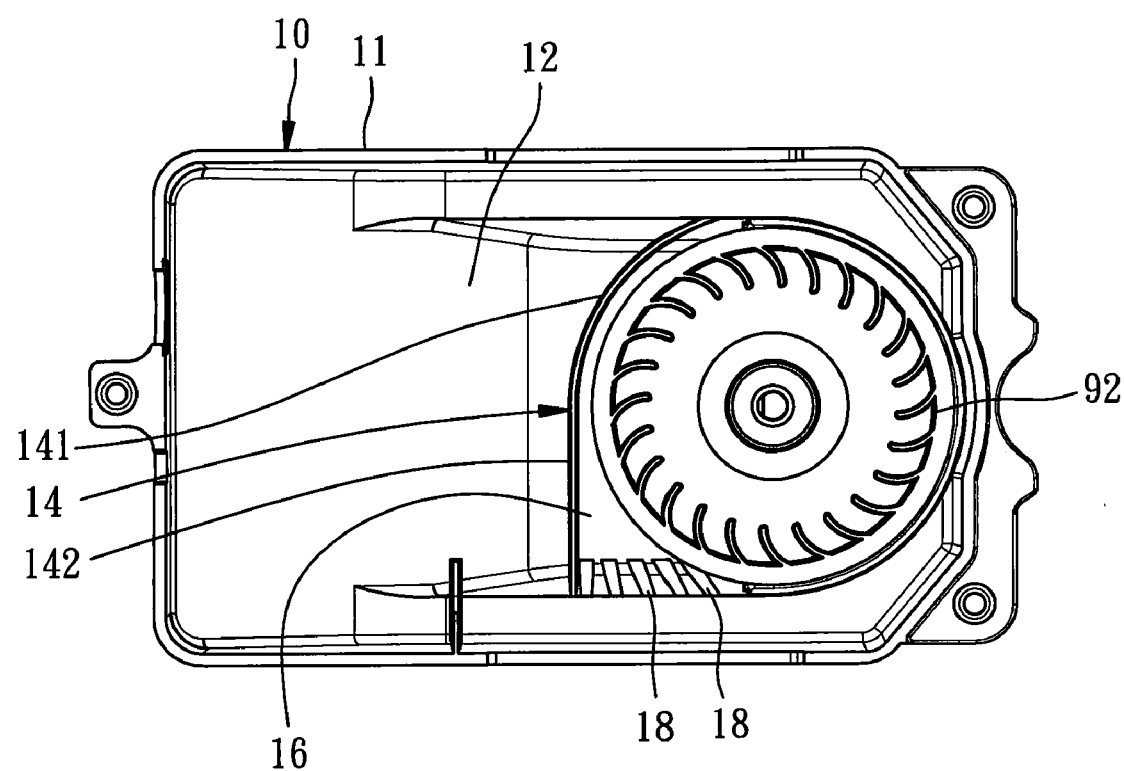
FIG. 7 is a schematic top view illustrating an operation status of the first embodiment of the present invention.

Referring to FIG. 6 and FIG. 7, during operation of the motor 91, hot air rises and enters the airflow zone 16. At the same time, the cooling vane 92 is being rotated by the motor 91 (in the direction as indicated by the arrowhead sign at the cooling vane) to cause flowing of air in the airflow zone 16 along the border area of the airflow zone 16 subject to the arrangement of the cooling vane 92 in interference with the airflow zone 16.

During rotation of the cooling vane 92 to cause flowing of air in the airflow zone 16 along the border area of the airflow zone 16, the induced airflow will disperse outwards when reaches the horizontally extending air outlets 17. When the induced airflow reaches the guide wall 14, it will flows along the arched segment 141 toward the straight segment 142 and will then be stopped by the straight segment 142 and forced to change its flowing direction toward the outside through the vertically extending air outlets 18. Because the vertically extending air outlets 18 are axially set in a tangential manner relative to the cooling vane 92, the induced airflow can be guided out of the vertically extending air outlets 18 smoothly without interference. Subject to reduced air pressure in the shield body 11 at this time, outside cooling air is guided into the chamber 12 through the air inlets 19.

As stated above, the motor shield in accordance with the first embodiment of the present invention enables hot air to be forced to flow toward the outside and then to disperse, enhancing dissipation of heat.

Figure 8:
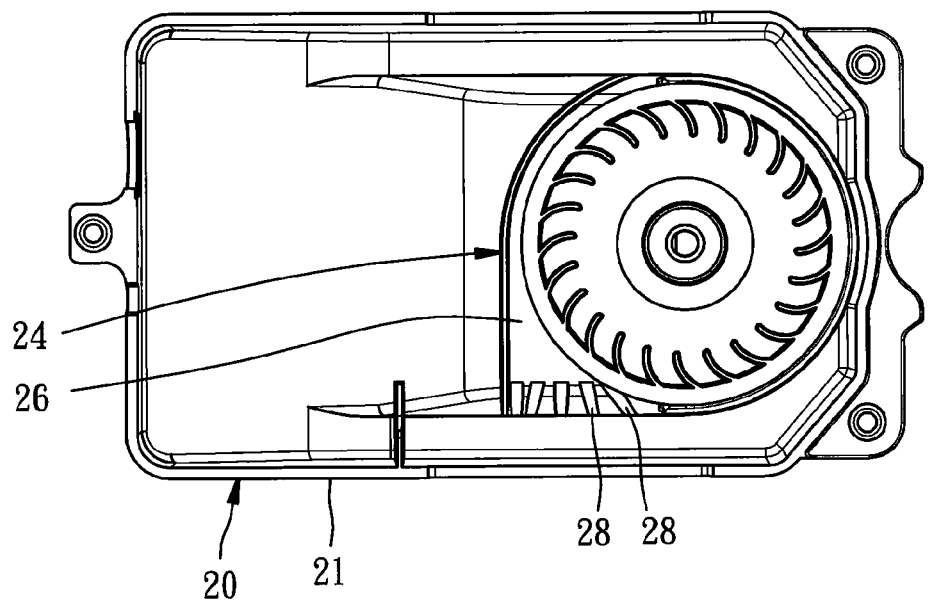
FIG. 8 is a schematic top view illustrating an operation status of a second embodiment of the present invention.

FIG. 8 illustrates a motor shield 20 in accordance with a second embodiment of the present invention. This second embodiment is substantially similar to the aforesaid first embodiment with the exception that the vertically extending air outlets 28 are axially arranged in the shield body 21 in a radial relationship.

Thus, when the airflow induced in the airflow zone 26 is forced by the guide wall 24 to flow toward the vertically extending air outlets 28, the radial arrangement of the vertically extending air outlets 28 facilitates dispersion of the airflow into the outside open space, enhancing heat dissipation efficiency.

The other structural details, operation and effects of this second embodiment are same as the aforesaid first embodiment, and therefore no further detailed description in this regard is necessary.

Figure 9:
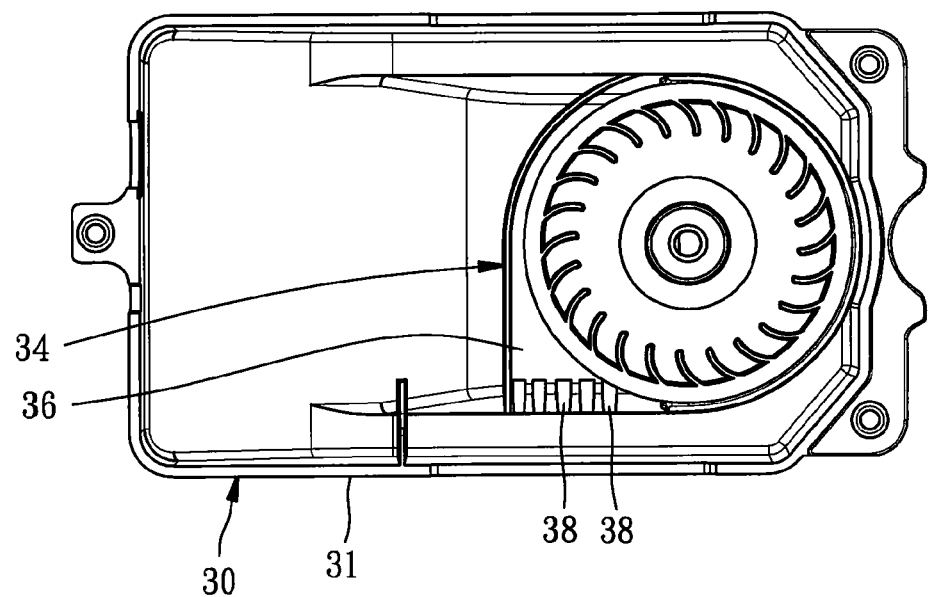
FIG. 9 is a schematic top view illustrating an operation status of a third embodiment of the present invention.

FIG. 9 illustrates a motor shield 30 in accordance with a third embodiment of the present invention. This third embodiment is substantially similar to the aforesaid first embodiment with the exception that the vertically extending air outlets 38 are axially arranged in the shield body 31 in a parallel relationship.

Thus, when the airflow induced in the airflow zone 36 is forced by the guide wall 34 to flow toward the vertically extending air outlets 38, the parallel arrangement of the vertically extending air outlets 38 cuts the airflow into multiple currents that flow out of the motor shield 30 in a parallel manner without interfering with one another, enhancing heat dissipation efficiency.

The other structural details, operation and effects of this third embodiment are same as the aforesaid first embodiment, and therefore no further detailed description in this regard is necessary.

In conclusion, the design of the arched segment 141 and straight segment 142 of the guide wall 14 and the design of the arched portion 111 and straight portion 112 of the top wall of the shield body 11 facilitate expelling of the induced airflow, enhancing heat dissipation efficiency.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A motor shield installed in a drainage device of a cooling/air-conditioning system and covered on a motor of said drainage device over a cooling vane at said motor, the motor shield comprising:
   a shield body defining a chamber for accommodating said cooling vane of said motor, said shield body having a top wall thereof divided into an arched portion and a straight portion;
   a guide wall disposed in a top side in said shield body within said chamber, said guide wall having an arched segment and a straight segment connected to said straight segment of said guide wall;
   an airflow zone defined in said chamber inside said shield body in an interference relationship relative to said cooling vane of said motor and surrounded by said arched segment and said straight segment of said guide wall and said arched portion and said straight portion of said top wall of said shield body;
   a plurality of horizontally extending air outlets located on said arched portion of said top wall of said shield body;
   a plurality of vertically extending air outlets located on said straight portion of said top wall of said shield body; and
   at least one air inlet located on the periphery of said shield body.

2. The motor shield as claimed in claim 1, wherein said vertically extending air outlets are axially arranged in a parallel relationship.

3. The motor shield as claimed in claim 1, wherein said vertically extending air outlets are axially arranged in a radial relationship.

4. The motor shield as claimed in claim 1, wherein said vertically extending air outlets are axially set in a tangential manner relative to said cooling vane.

5. The motor shield as claimed in claim 1, wherein said guide wall is a board member.

6. The motor shield as claimed in claim 5, wherein said board member is formed integral with said shield body.

7. The motor shield as claimed in claim 1, wherein said shield body comprises a plurality of reinforcing ribs that are spaced corresponding to said horizontally extending air outlets.

8. The motor shield as claimed in claim 1, wherein the number of said at least one air inlet is 2, and the two air inlets are located on the periphery of said shield body at two opposite sides.

9. The motor shield as claimed in claim 8, wherein shield body has two openings bilaterally located on a bottom edge thereof that form said two air inlets when said shield body is fastened to said drainage device.

* * * * *